H. DRUSCHEL.
FRICTION CLUTCH.
APPLICATION FILED AUG. 7, 1907.
916,682.
Patented Mar. 30, 1909.
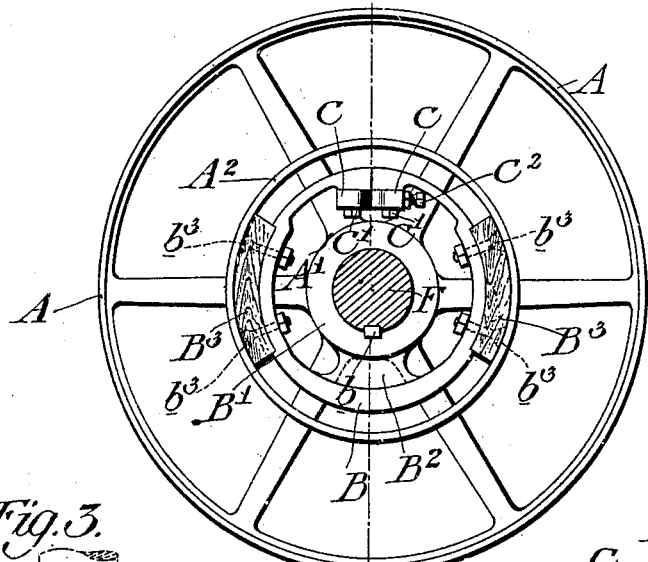
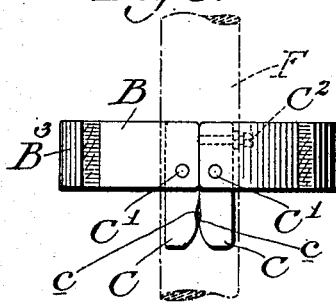
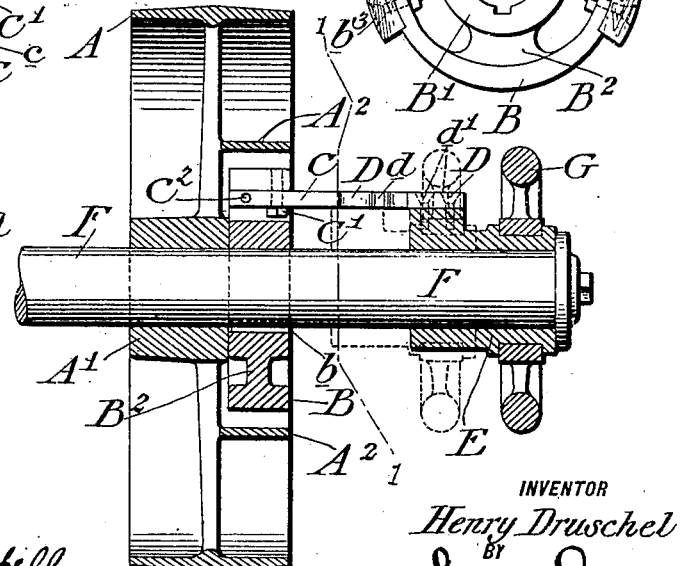
WITNESSES:
John E. Hubbell
INVENTOR
Henry Druschel
BY
ATTORNEY.

UNITED STATES PATENT OFFICE.

HENRY DRUSCHEL, OF PHILADELPHIA, PENNSYLVANIA.

FRICTION-CLUTCH.

No. 916,682.　　　　Specification of Letters Patent.　　Patented March 30, 1909.

Application filed August 7, 1907. Serial No. 387,414.

*To all whom it may concern:*

Be it known that I, HENRY DRUSCHEL, a subject of the Emperor of Germany, (having declared his intention of becoming a citizen of the United States,) residing at Philadelphia, in the county of Philadelphia and State of Pennsylvania, have invented certain new and useful Improvements in Friction-Clutches, of which the following is a specification.

This invention relates to improvements in friction-clutches, particularly adapted for use in connection with gas and naphtha engines, and has for its object the production of a clutch at once simple and positive in its action and adjustable in its working parts to compensate for wear. These objects I accomplish by means of the construction illustrated in the accompanying drawing in which, Figure 1 illustrates a front elevation of a pulley provided with one of these clutches, a portion of the clutch being broken away as indicated by the line 1—1 of Fig. 2. Fig. 2 is a vertical section taken on line 2—2 of Fig. 1. Fig. 3 is a detached plan view of the friction ring and ring spreading fingers. Fig. 4 shows a detached front elevation of the friction ring and spreading fingers as illustrated in Fig. 3, and Fig. 5 is a detached plan view of the operating wedge.

Referring to the several parts by letters of reference, A, denotes the rim of a wheel or pulley; $A^1$ the hub and $A^2$, a flange or ring secured to the spokes and located midway between the hub and the rim.

B represents a split ring connected to its hub $B^1$ by a web $B^2$ and provided with segmental blocks $B^3$, $B^3$, adapted to bear against the inner surface of the ring $A^2$. The ring B, is also provided with fingers, C, C, fulcrumed to the ring at points $C^1$, the inner sides of the fingers being tapered off to form a V shaped groove for the reception of the finger D.

The finger D is secured to a sleeve E by machine screws $d$, $d$, which sleeve is loosely mounted upon the shaft F and capable of being moved backward and forward thereon by a hand wheel G, in like manner loosely mounted on the sleeve E.

In order to compensate for wear on the blocks $B^3$, $B^3$, one of the fingers C is provided with a nut $C^2$, which when forced against the opposite member C, will cause a greater spreading of the ring B when the wedge D is inserted between the fingers C C.

It will be noticed in the drawings that the pulley A is loosely journaled upon the shaft F, as is also the case with the sleeve E, but that the ring B is fixed to the shaft by means of a key $b$, so that when said ring is spread apart by the insertion of the wedge D, between the fingers C C, the blocks $B^3$, $B^3$ will be caused to bear against the inner side of the ring $A^2$ and cause the rotation of the pulley A by such engagement.

As shown in Fig. 3 of the drawings, the fingers C, C, are slightly recessed at points $c$, $c$, where the wedge D enters to spread the ring B, and the wedge D, as shown in Fig. 5 is provided with rounded projections as indicated at $d$, $d$. The object of this construction being to cause a locking of the wedge D, between the fingers C, C, when said wedge has been pressed forward to the full extent of its movement.

Having described my invention what I claim and desire to secure by Letters Patent is:

1. A friction-clutch, comprising a flanged wheel adapted to move freely upon a shaft, a split ring connected to a hub adapted to be fixed to the shaft, fingers fulcrumed to the free ends of said ring, a wedge adapted to engage the fingers to spread the ring into engagement with the flange and projections formed upon said wedge to engage corresponding depressions in the fingers to cause an interlocking of said parts when brought together.

2. A friction clutch comprising a driving shaft, a pulley-wheel loosely hung thereon and provided with a flange, a split ring, a hub, a web connecting said ring to said hub at a point opposite the free ends of the ring, fingers arranged side by side and fulcrumed to the under side of the free ends of the split ring, a wedge adapted to engage the fingers to spread the ring, projections $d$, $d$, formed upon the wedge to engage corresponding depressions $c$, $c$, in the fingers to lock said parts together substantially in the manner described.

In testimony whereof I affix my signature in presence of two witnesses.

HENRY DRUSCHEL.

Witnesses:
　　DAVID S. WILLIAMS,
　　ARNOLD KATZ.